Oct. 12, 1937.    O. SHIMWELL    2,095,576
WEFT INSERTING AND BEATING-UP MECHANISM OF LOOMS FOR WEAVING
Filed Jan. 28, 1935    8 Sheets-Sheet 4
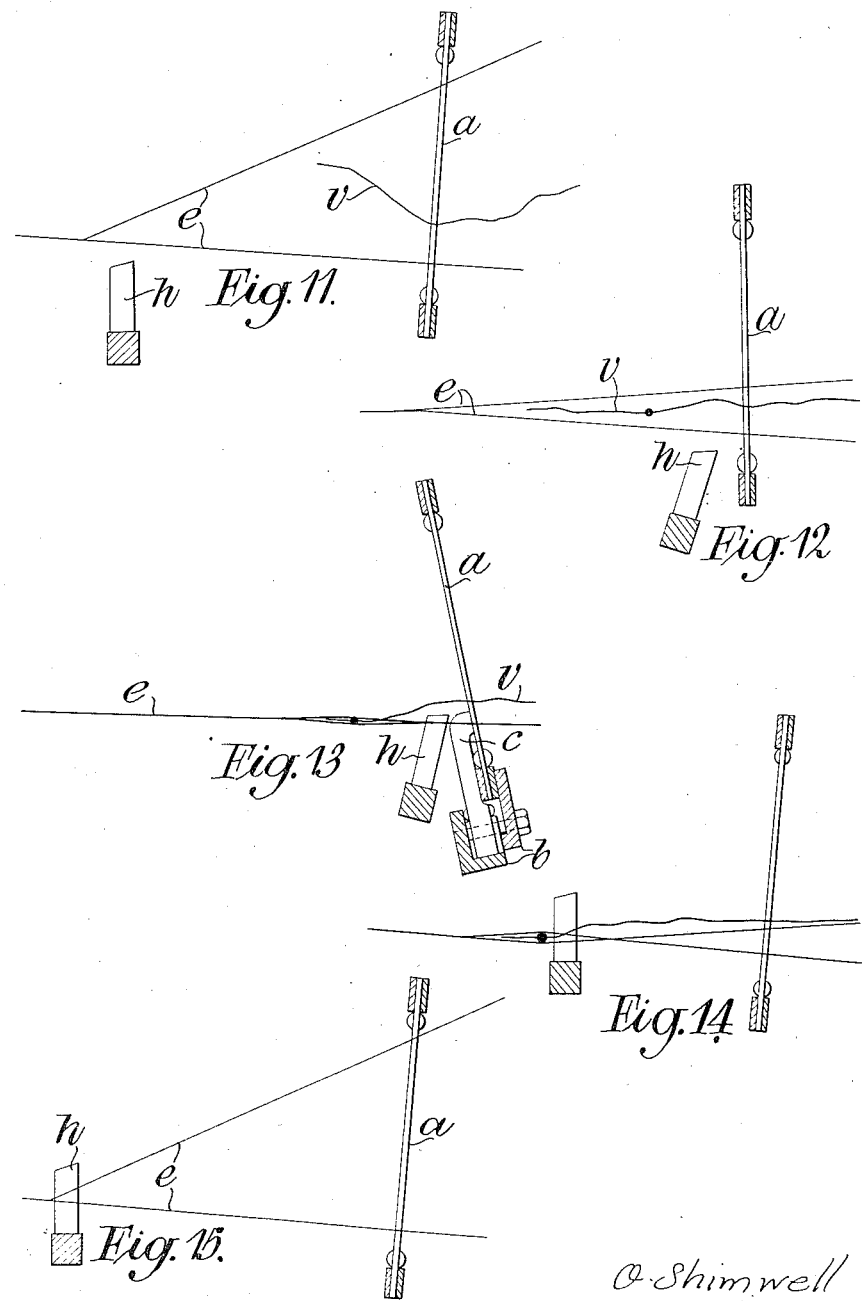

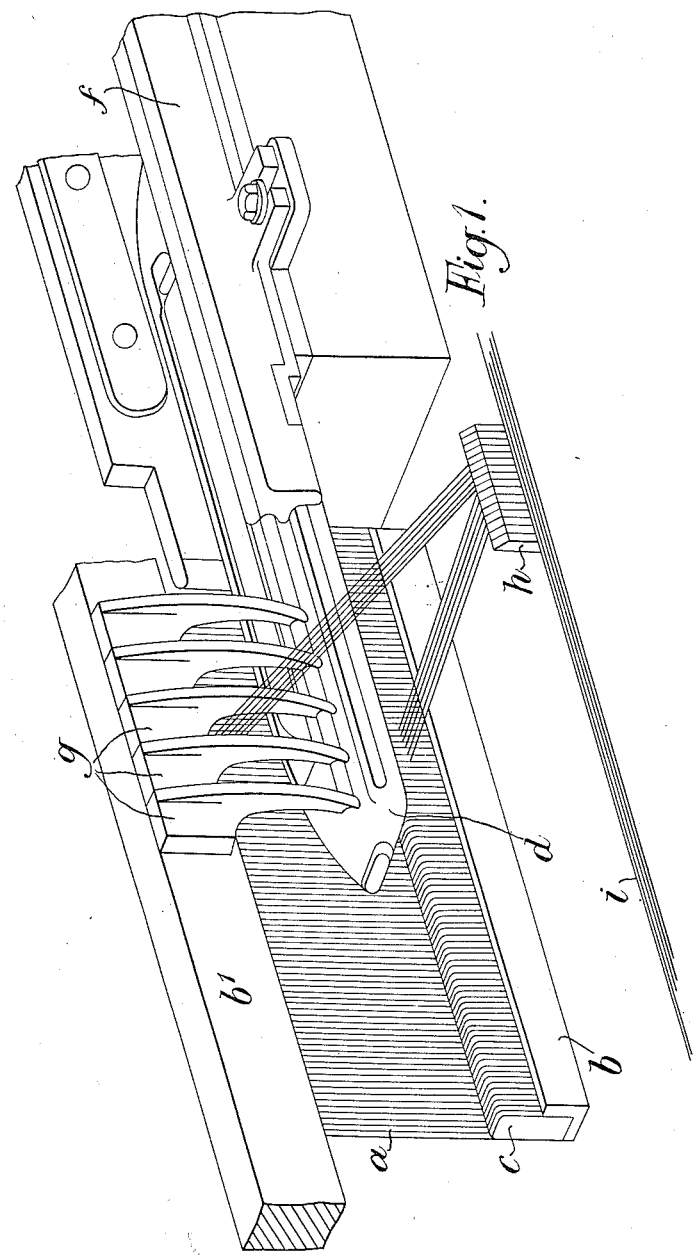

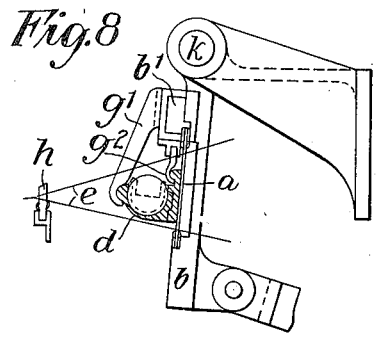
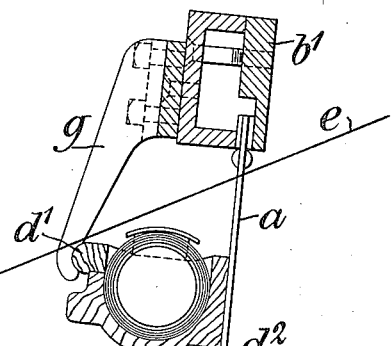
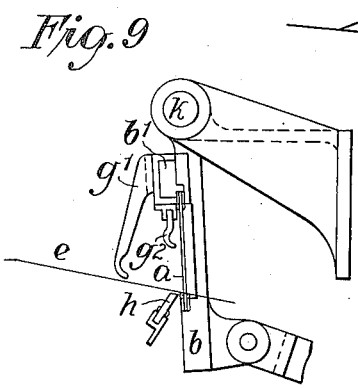
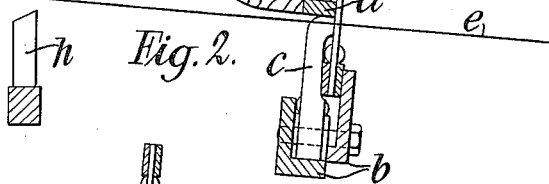
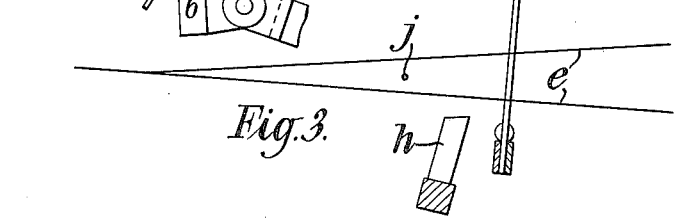
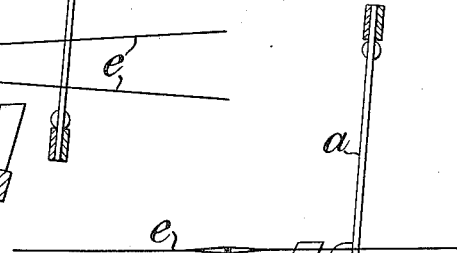
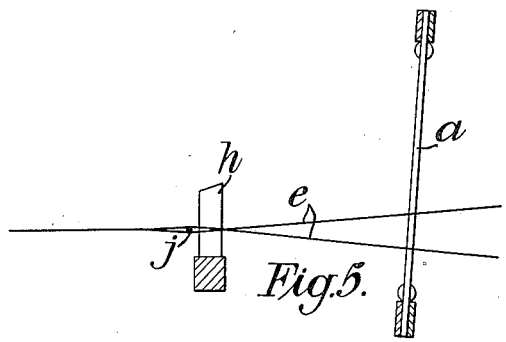

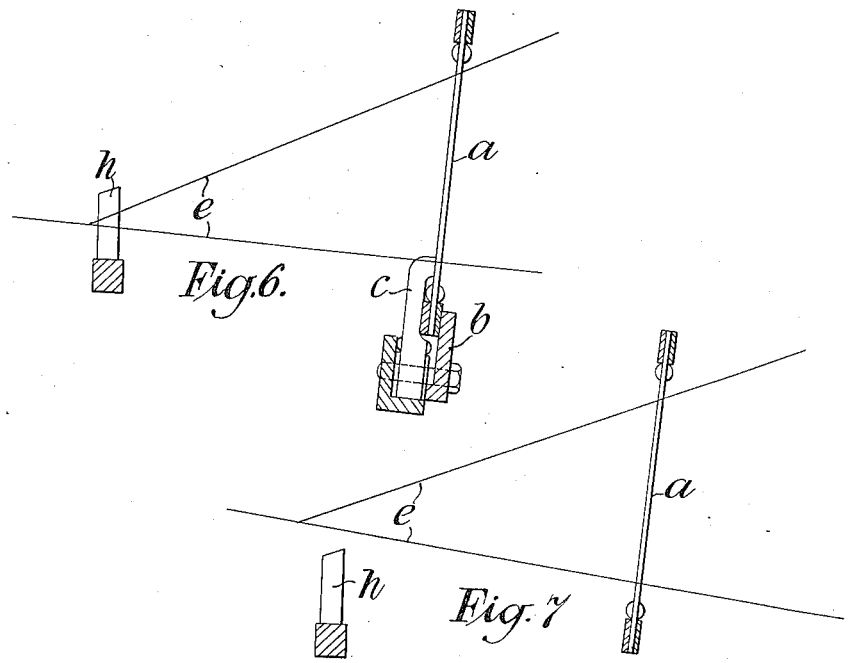
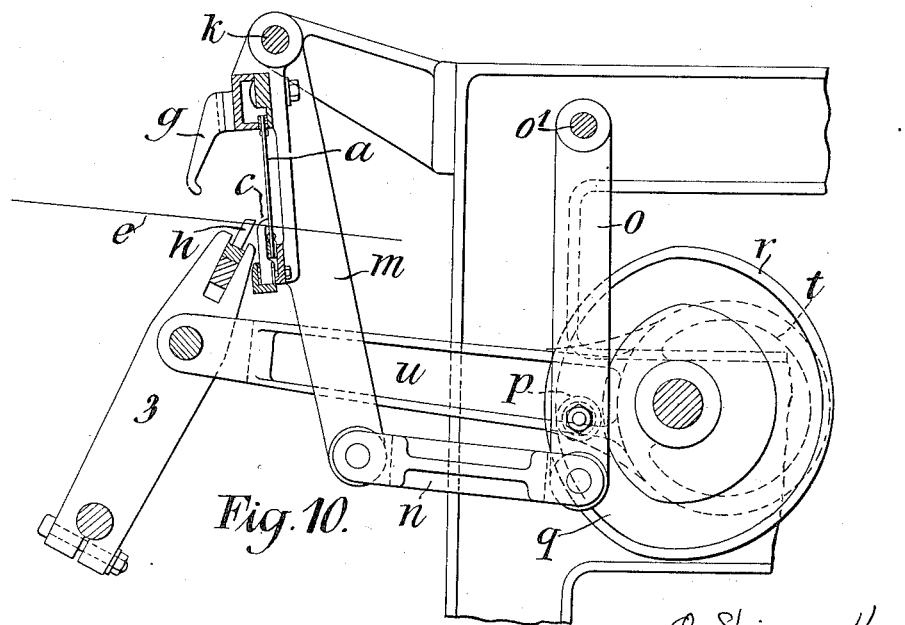

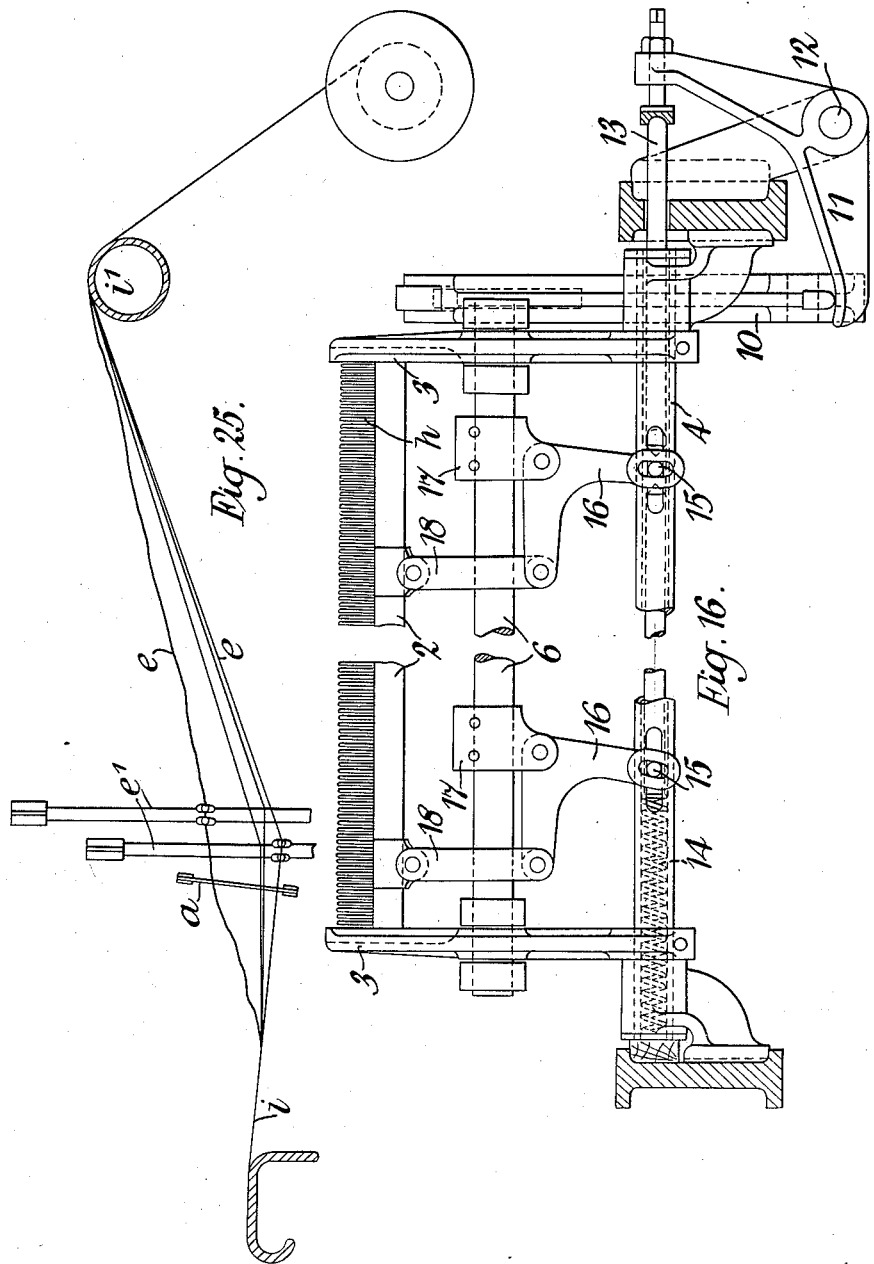

Oct. 12, 1937.   O. SHIMWELL   2,095,576
WEFT INSERTING AND BEATING-UP MECHANISM OF LOOMS FOR WEAVING
Filed Jan. 28, 1935   8 Sheets-Sheet 6

O. Shimwell
INVENTOR
By Glascock Downing & Seabold
ATTYS.

Oct. 12, 1937.     O. SHIMWELL     2,095,576
WEFT INSERTING AND BEATING-UP MECHANISM OF LOOMS FOR WEAVING
Filed Jan. 28, 1935     8 Sheets-Sheet 7

Patented Oct. 12, 1937

2,095,576

UNITED STATES PATENT OFFICE

2,095,576

WEFT INSERTING AND BEATING-UP MECHANISM OF LOOMS FOR WEAVING

Oliver Shimwell, Gawsworth, England

Application January 28, 1935, Serial No. 3,847
In Great Britain February 23, 1934

10 Claims. (Cl. 139—188)

This invention relates to the weft inserting and beating-up mechanism of looms for weaving and has for its object to provide improvements which will allow of an increased portion of the time of each cycle of operations being taken up by the picks of the shuttle, so that the loom can be speeded up without the necessity of speeding up the shuttle or shuttles. The invention also provides a more efficient and satisfactory beating-up mechanism in which broken ends adjacent to the reed are satisfactorily dealt with so that they do not interfere with the proper shedding of the warp threads.

This invention comprises the combination with a stationary reed which takes no part in beating-up, of a comb-like part adapted to rise and enter between the warp threads adjacent to the reed and to move forwards therefrom to the beat-up position, when it is lowered clear of the warp threads and returns for a further beat-up cycle of operations.

The invention further comprises the arrangement wherein the reed moves partly towards the beat-up position, the comb rising and entering the warp threads adjacent to the reed when the latter is closest to the beat-up position, after which the reed returns to its initial position and the comb moves to the beat-up position, being then lowered clear of the warp threads and returned for a further beat-up cycle of operations.

The invention further comprises the arrangement wherein the reed is moved backwards from its normal weaving position before the beat-up comb rises and enters the warp threads adjacent to the reed so that any broken ends which were adjacent to the reed when the latter was in the weaving position will be in front of the beat-up comb when the latter rises and enters the warp threads adjacent to the reed.

The invention further comprises the arrangement wherein, in the case where the reed moves towards the beat-up position, the reed moves slightly backwards from its position of closest proximity to the beat-up position before the comb rises and enters the warp threads adjacent to the reed.

The invention further comprises the provision in front of the reed of a relatively narrow strip or track of comb-like character upon which the shuttle rides above the level of the lower row of warp threads which are in the dents of the strip or track, the said dents receiving the warp threads from the reed and serving to space all such threads prior to and for the entry between the threads of the prongs of the beat-up comb.

The invention further comprises the provision of selvedge needles which enter from above the warp threads in the selvedge as the beating-up comb withdraws downwards so that the said needles support the said warp threads against the inward pull of the weft threads, the selvedge needles being displaced from their service positions as the beat-up comb approaches the beat-up position.

The invention further comprises the arrangement wherein the reed is adapted for sideways movement to displace the warp threads relatively to the dents of the narrow strip or track upon which the shuttle rides so as to effect an interchange of warp threads in the dents of the strip or track at beating-up which ensures a good even finished fabric.

The invention further comprises a beat-up cycle of operations consisting of (1) lowering the raised warp threads so that all the warp threads are in line, (2) causing the beating-up comb to raise and enter between the spaced warp threads, (3) moving the beating-up comb forwards, (4) raising the warp threads to form the upper part of the next shed (5) starting the shuttle on its next traverse through the shed (6) completing the forward stroke of the beating-up comb (7) lowering the beating-up comb out of the warp threads and (8) returning the beating-up comb to a position adjacent to the reed for a further cycle of operations.

The invention further comprises the step in the said beat-up cycle of moving the reed backwards before, simultaneously with or after step (1) but prior to step (2).

The invention further comprises the arrangement wherein the threads in the lower row of warp threads are tighter than the threads in the upper row and remain in their low position whilst the upper row of threads is lowered and their tension gradually increased until they are in line with the lower row, when the beating-up comb enters the whole of the warp threads, the arrangement obviating crossing of warp threads whilst in motion and jerks and unevenness in the threads due to rapid alterations of warp tension.

Referring to the accompanying sheets of explanatory drawings:—

Figure 1 is a general perspective view of part of the reed, slay, beating-up comb, shuttle box and shuttle of a loom constructed and arranged in one convenient form in accordance with this invention.

Figure 2 is a cross sectional view through the shuttle, reed and slay of Figure 1 but showing the beating-up comb below the warps.

Figures 3, 4, 5, 6 and 7 are diagrams illustrating the beating-up cycle.

Figure 8 is a cross sectional view similar to Figure 2 but showing a modified arrangement of the shuttle and the means for controlling it in its flight. The beating-up comb is here shown in its beat-up position.

Figure 9 shows the beating-up comb entering the warp threads adjacent to the reed to commence the beat-up operation, the reed and slay being drawn backwards prior to such entry to ensure that any broken ends adjacent to the reed are straightened out by the beating-up comb as it moves to the beat-up position.

Figure 10 shows the arrangement of Figure 1 modified so that the lower end of the reed and slay are drawn backwards prior to the beating-up comb entering the warp threads.

Figures 11, 12, 13, 14 and 15 show the beating-up cycle with the arrangement in which the reed and slay are moved backwards prior to the beating-up comb entering the warp threads adjacent to the reed.

Figure 16 is a front view and Figure 17 an end view of the mechanism by which the beating-up comb is operated.

Figure 25 shows the arrangement of the warp threads in the loom, and indicates that the lower row of warp threads in the shed is tighter than the upper row.

Figure 17:
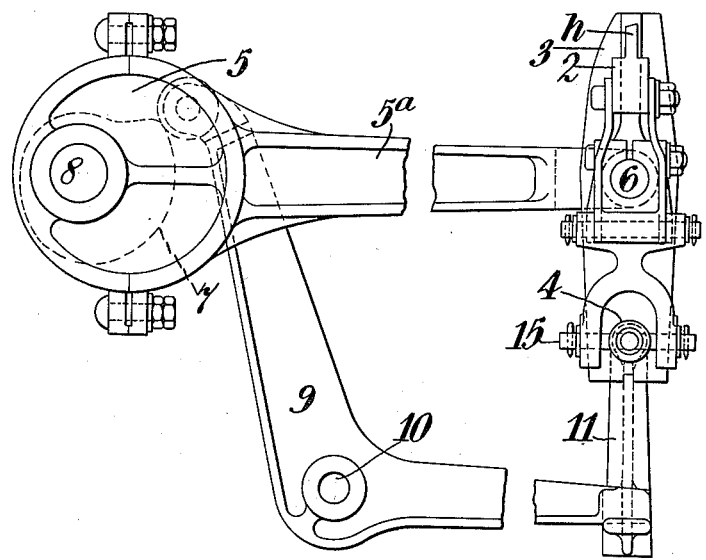
Figure 19:
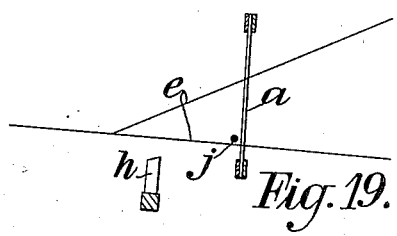
Figures 19, 20, 21 and 22 show the beating-up cycle with the Figure 18 arrangement.

In Figures 1–7, $a$ indicates the reed, $b$ the slay of which the part $b^1$ constitutes the hand or top rail; $c$ a narrow strip or track of comb-like character on which the shuttle $d$ rides in its flight through the shed formed by the upper and lower rows of warp threads $e$, $f$ the shuttle box, $g$ the overhanging arms or fingers secured to the top rail $b^1$ for holding the shuttle up to the reed $a$ when in flight, and $h$ the beating-up comb. $i$ indicates a part of the woven cloth.

During weaving the lower row of warp threads passes through the dents of the narrow track $c$ so that the shuttle which rides on the track is clear of such threads.

The cycle of operations during beating-up will be followed from a consideration of Figures 3–7 coupled with the following description. Figure 3 shows the weft thread which is to be beaten-up, at $j$ in the position in which it was left by the shuttle. The beating-up comb is in a position beneath the warp threads and close to the slay and reed. The upper warp threads are first lowered to be in line with the lower warp threads as shown in Figure 4. All the warp threads are thus spaced in the dents of the track $c$. The beating-up comb now rises into the spaced warp threads adjacent to the track $c$ so that it enters the spaces freely. This is shown in Figure 4. The comb now commences to move forwards carrying the weft thread with it as shown in Figure 5 and when it has proceeded a short distance, re-shedding takes place as shown in Figure 5. As soon as re-shedding has sufficiently advanced and even before the beating-up comb has reached the final beat-up position, the shuttle can commence its next flight through the shed. Beat-up is now completed as shown in Figure 6 and the beating-up comb is withdrawn downwards from the warp threads as shown in Figure 7. Such comb can now move backwards to the Figure 3 position for a further beat-up cycle.

It will be noted from Figure 2, that the underside of the shuttle $d$ is rounded off at the side away from the reed so that should the shuttle for any reason fail in its flight through the shed, the beating-up comb $h$ will be clear of the underside of the shuttle and so no damage will result.

The shuttle is provided with suitable hardwood strips at $d^1$, $d^2$ for engagement with the arms or fingers $g$ and the narrow track $c$.

It will have been noted from the foregoing description of the beating-up cycle, that the slay and reed are stationary, the reed serving merely to space the warp threads and the slay carrying the reed and the shuttle supports and guides.

The dents of the comb-like track $c$ may be spaced the same as the dents of the reed $a$ or the said dents may be spaced more widely so as to receive the threads from two or more slits or dents of the reed. The beating-up comb should have its dents or spaces to correspond with those of the track $c$ in order to ensure proper entry of the beating-up comb into the warp threads which are held in spaced relationship by the track $c$.

An important advantage of the above beating-up cycle will have been noted, namely the possibility of the shuttle commencing its flight through the shed before beating-up has actually been completed. This means that a larger proportion of the weaving cycle time can be taken by the shuttle with the result that the weaving cycle can be speeded up without the necessity of speeding up or correspondingly speeding up the shuttle in its flight. The advantages of this from a practical point of view will be readily appreciated.

A further important advantage of the beating-up cycle before described has reference to the movement of the warp threads during shedding. It will have been noted that the upper row of warp threads is lowered to the level of the lower row. I arrange that the lower row is always under slightly greater tension than the upper row. The disposition of the warp threads will be appreciated by reference to Figure 25 where it will be noted that the path of the upper row of warp threads between the cloth at $i$ and the fixed tension bar $i^1$ is shorter than the path of the lower row of warp threads between the same points. (The healds are shown at $e^1$, Figure 25). The fact that the upper warp threads are gradually brought up to maximum tension which occurs when in line with the lower warp threads and are not as in present loom practice first brought to maximum tension and then reduced to a lower tension, ensures the removal of all jerks and sudden strains in the warp threads during shedding. In addition, my arrangement in which the warp threads never cross one another whilst in motion, that is during shedding, assists in preventing rubbing of and damage to threads due to the speed of shedding.

Figures 8 and 9 show a modification in which the shuttle d is supported and held against the reed a entirely by arms or fingers depending from the hand or top rail b¹ of the slay. It will be seen that there are two sets of arms or fingers g¹, g² which engage the shuttle at different levels. By this arrangement I can do away with the comb-like track which is lettered c in Figure 1 and can bring the beating-up comb h close against the reed a during the commencement of the beat-up cycle. This feature is shown in Figure 9.

Figures 8 and 9 show a further feature of my invention, namely the moving backwards of the lower end of the slay and reed prior to the beating-up comb entering the warp threads but it will be more convenient to describe this feature with reference to Figures 10-15, in which however, the comb-like track c is shown instead of the means shown in Figures 8 and 9 for supporting and guiding the shuttle in its flight through the shed. It will be seen on referring to Figure 10 that the slay is pivotally mounted upon a spindle k which is adapted to be turned by arms m (one at each side of the loom) coupled to links n pivoted to suspension arms o pivoted at o¹. Upon the arm o is a bowl or roller p which runs in a cam slot q in a rotating cam r. The beating-up comb h is carried by levers s which are moved by eccentrics t through rods u there being an eccentric at each side of the loom. The details of means for giving the beating-up comb the desired cycle of movement will be described more fully in connection with Figures 16 and 17. The cam groove q acting through the bowl or roller p and associated parts o, n, m causes the slay to turn about the spindle k in a backward direction immediately prior to the beating-up comb entering the warp threads adjacent to the reed or the comb-like track c. In Figure 10, the slay is shown drawn backwards and the beating-up comb engaged between the warp threads. Due to the angular movement of the slay and reed about the spindle k, I can insert the beating-up comb into the warp threads closer to the comb c or to the reed in the case illustrated in Figure 9 and so ensure with even greater certainty that the beating-up comb enters correctly between the spaced warp threads in the spacing determined by c or the reed a. The great importance of the backward movement of the slay and reed prior to the beating-up comb entering the warp threads lies in the fact that it enables the beating-up comb to enter the warp threads behind any broken thread which may be adjacent to the reed when the latter is in the weaving position, so that the beating-up comb can straighten out the broken end and prevent it becoming entangled in the warp threads during shedding which would prevent shedding and result in serious damage on the next flight of the shuttle. This feature will be understood clearly from a consideration of Figures 11-15 of the drawings. In Figure 11, a broken end v is shown adjacent to the reed a which is in the normal weaving position. In Figure 12 the reed is shown drawn slightly backwards or to the right and the shed closing with the broken end entangled in the warp threads. In Figure 13, the reed is drawn fully back, the broken end v and the weft thread are in the warp threads which are now at one level and the beating-up comb h has entered the track c and behind the end v of the broken thread. In Figure 14, the beating-up comb has moved towards the beat-up position and is straightening out the broken warp thread whilst it carries the weft thread forward. The shed is opening and the reed a has returned to its forward or weaving position. In Figure 15, beating-up is completed. The great advantage of being able to straighten out a broken end by means of the beating-up comb will be quite obvious and this ability is derived from the rearward movement of the reed immediately prior to beating-up enabling the beating-up comb to enter behind the broken end.

In Figures 16 and 17, an arrangement of mechanism for operating the beating-up comb h is illustrated. Such comb projects from a holder or base 2 which at its ends can slide in arms 3 pivoted about a hollow spindle 4, the pivotal movement of the arms 3 about the spindle 4 being effected by an eccentric 5 acting through a connecting rod 5ᵃ coupled to a rod 6 passing between and secured at its ends to the two arms 3. It will be seen therefore that the backward and forward movements of the comb result from the rotation of the eccentric 5. The upward movements of the comb are due to the cam 7 on the shaft 8 (carrying the eccentric 5) turning the lever 9 about its pivot 10, such lever turning a bell crank lever 11 about its pivot 12. An arm of the bell crank lever pushes a spindle 13 (against the pressure of a spring 14) axially through the hollow spindle 4. The spindle 13 has cross pins 15 therethrough which turn bell crank levers 16 turning about brackets 17 on the rod 6. The bell crank levers 16 are coupled to links 18 connected to the comb holder 2. Thus the cam 7 raises the comb h positively and the spring 14 lowers it.

Figure 20:
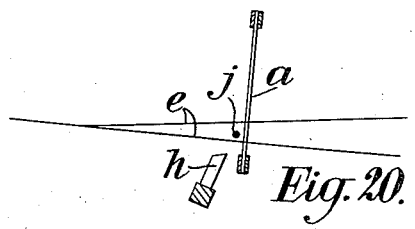
Figure 21:
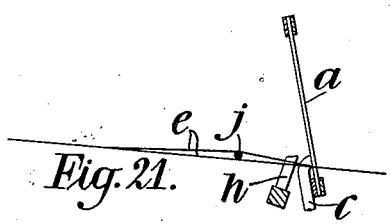
Figure 22:
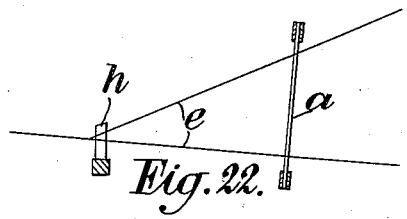
Figure 18:
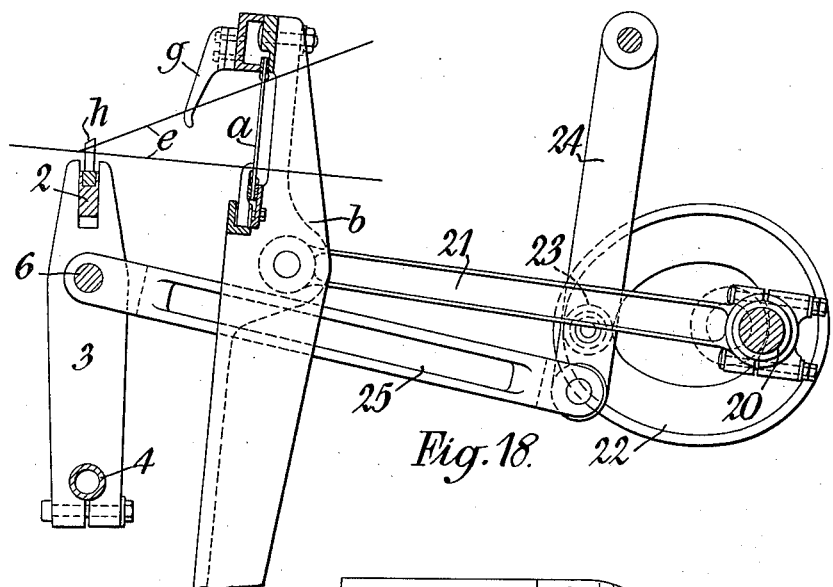
Figure 18 is a cross sectional view similar to Figure 2 but modified to provide for first a forward and then a backward movement of the reed and slay before the beating-up comb enters the warp threads.

In the arrangement shown in Figures 18-22, the reed a and slay b have both a forward and a backward movement during beating-up before the beating-up comb h enters the warp threads adjacent to the reed. As shown in Figure 18, the slay is moved forwards and backwards by the crank 20 and the connecting rod 21. The beating-up comb derives its back and forth movements from the cam groove 22, bowl 23 entering such groove, arm 24 carrying the bowl, and connecting rod 25 attached to the rod 6 extending between the arms 3 (see Figures 16 and 17) in which the comb holder 2 has up and down movements. The cycle of movements will be best appreciated from Figures 19-22, Figure 19 shows the weft thread j to be beaten up adjacent to the reed a which is in the weaving position. The reed is now moved forward and carries the weft thread with it. This is shown in Figure 20. Then the reed moves backwards clear of the weft thread and then the beating-up comb rises and enters the warp threads (which are all in line) adjacent to the reed. This is shown in Figure 21. Figure 22 shows the reed back in its weaving position and the beating-up comb in the final beat-up position. Thereafter the beating-up comb is lowered to the Figure 19 position.

Figure 26:
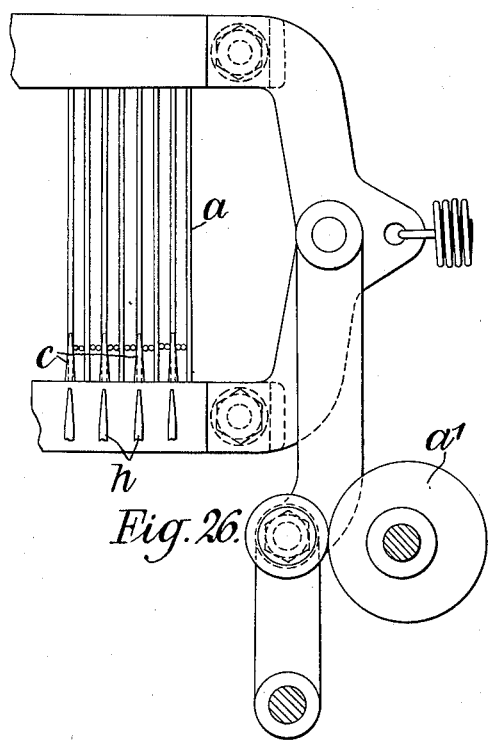

Figure 26 shows one convenient arrangement for effecting interchange of threads between the reed and beating-up comb so as to ensure the production of a good even finished cloth. In this arrangement, the reed a is adapted to have a movement imparted to it by the eccentric a¹ in a direction across the loom whilst the comb-like track at the base of the reed remains stationary. Each space or dent of the reed has two warp threads in it, which are shedded so that one is up and one down. The teeth of the comb-like track are so spaced that they will hold the four warp threads from two spaces or dents of the reed. Now if the reed were not moved laterally, then when the upper threads were lowered to the level of the lower threads prior to each beating-up, then the same four threads would always be between any one pair of teeth in the comb-like track. If however the lower warp threads are raised slightly by the usual healds so that they are above the comb-like track and then the reed is moved across the loom a distance equal to the pitch of the dents, then if the whole of the warp threads are now lowered into the comb-like track ready for beating-up by the comb $h$, they will be spaced differently in said track from what they would have been without such cross movement of the reed. Prior to the next beating-up cycle, the reed will be moved in the opposite direction to space the warp threads differently in the comb-like track. It will be noted that the spacing of the teeth of the beating-up comb $h$ is the same as the teeth of the track $c$, so that the varying of the disposition of the threads as between the reed and track will cause a corresponding variation in the beating-up comb.

Figure 23:
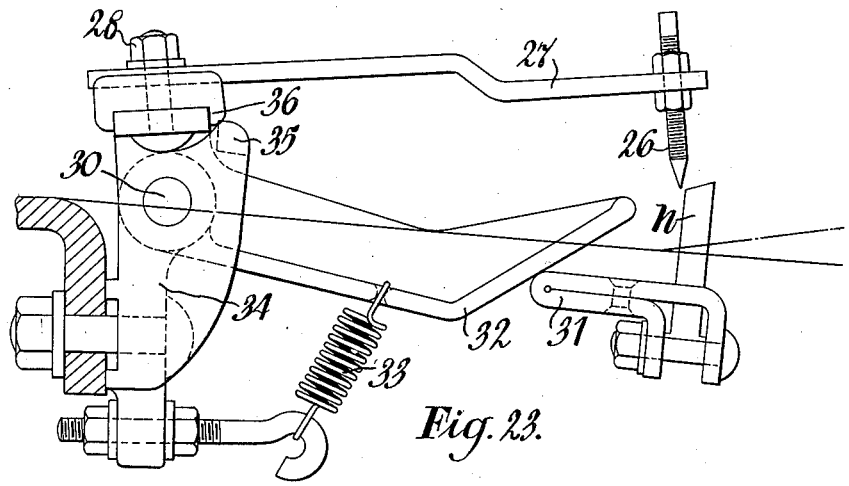
Figure 23 is a side view and Figure 24 a plan view of the means for maintaining the cloth width and preventing such a drawing in of the warp threads as would prevent the beating-up comb from entering the warp threads correctly.
Figure 24:
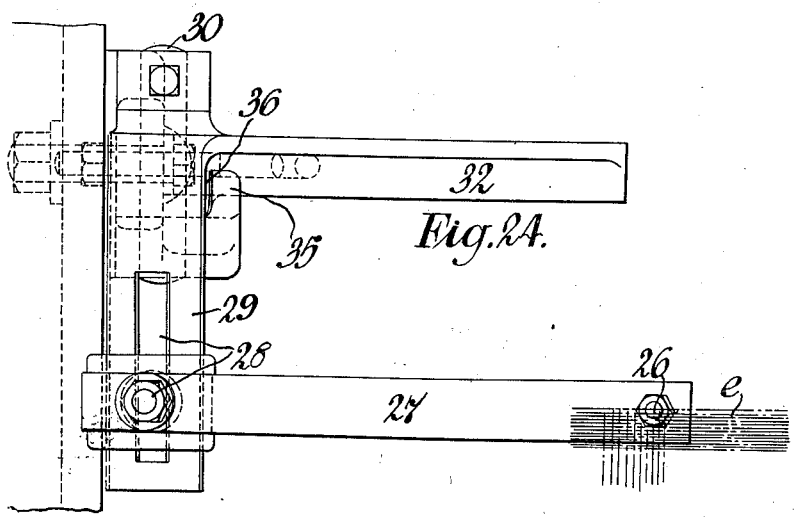

Figures 23 and 24 show the means by which the width of the fabric which is woven is maintained so that no drawing in of the warp threads occurs such as would interfere with the correct entry of the teeth of the beating-up comb into and its travel in the spaces between the warp threads. It will be seen that a needle-like part 26 is carried by an arm 27 secured by a pin and slot connection 28 to a plate-like part 29 which forms part of a fitting adapted to be turned about a fulcrum pin 30 by a part 31 secured upon the beating-up comb holder engaging the arm 32 forming part of the fitting. A spring 33 pulls the arm 32 and therefore the needle 26 downwards when the part 31 has moved clear of the arm 32 after the beating-up cycle is completed. The bracket 34 which carries the fulcrum pin 30 has a stop piece 35 thereon which limits the downward movement of the needle 26 by engaging the corner 36 of the plate 29 as shown in Figure 23. It will be understood that there is a selvedge needle 26 at each side of the sheet of warp threads and that the beating-up comb holder has a part 31 thereon at each side of the loom.

In operation, as the beating-up comb $h$ approaches the beating-up position, the parts 31 cause the needles 26 to be raised out of the selvedge and when the beating-up cycle is completed and the beating-up comb has been lowered clear of the warp threads, the needles 26 will again enter the selvedge threads and prevent pulling in which might prevent the warp threads being properly engaged by the prongs of the beating-up comb $h$ or might result in breakage of threads as the comb $h$ moves to the beating-up position.

Looms with stationary slays and separate beat-up combs have heretofore been proposed but none of the prior proposals has provided, so far as my knowledge goes, a satisfactory beat-up mechanism. It is a problem of very great difficulty to get the beat-up comb into the warp threads in a satisfactory manner without uneven bunching of the warp threads in the comb spaces. With my invention I provide for all the warp threads being brought into line by lowering the upper row of warp threads before the comb enters such threads and in addition I cause the comb to enter such threads at such a short distance (advantageously as short as one-sixteenth of an inch) from the reed or track which spaces the warp threads that the teeth of the comb enter the divisions formed by the reed or track in the warp threads; I find it impossible to cause the comb to enter the warp threads satisfactorily at a distance of say one inch from the reed or spacing track, because at such a distance the divisions made by the reed or track have disappeared. In addition, due to the drawing in of the threads in a direction towards the cloth, i. e. the actual beating up position, the divisions disappear towards the sides and the comb has to make its own divisions which are in consequence non-uniform and result in an unsatisfactory fabric. Further, as the comb like track (when such is employed) on which the shuttle rides must be narrow in order to maintain the spacing of the warp threads produced by the reed, separate provision has to be made for supporting the shuttle against the reed in its flight through the shed. If the said track be of normal shuttle width, the warp threads will fail to enter the slots for their whole length during shedding and will cross from slot to slot, with the result that the shuttle is liable to cut them when it runs over them. In addition any threads which cross from slot to slot will not be picked up in the correct spaces of the beating-up comb.

I claim:

1. Weft beating-up mechanism for looms comprising in combination a reed, a shuttle race parallel to said reed adapted to support and guide a shuttle and constituted at least in part by fingers located above the level of the bottom of the shuttle and in line with the dents of the reed, the said fingers engaging the side of the shuttle furthest from the reed, and holding the shuttle while in flight against the reed, a comb parallel to said reed, means to raise said comb to bring its teeth up into line with and in close proximity to dents of said reed, means to move said comb away from said reed to effect beating-up and means to lower said comb and to return it at a lower level to its initial position.

2. Weft beating-up mechanism for looms comprising in combination a reed, a shuttle race parallel to said reed adapted to support and guide a shuttle and constituted at least in part by fingers located above the level of the bottom of the shuttle and in line with the dents of the reed, the said fingers engaging the side of the shuttle furthest from the reed, and holding the shuttle while in flight against the reed, a comb parallel to said reed, means to raise said comb to cause its teeth to enter between warp threads passing between said reed dents, said comb teeth being caused to enter between said warp threads closely adjacent to said reed dents, means to move said comb substantially horizontally away from said reed to a beat-up position, means to lower said comb to a level in which its teeth are clear of said warp threads and means to return said comb at said level to its initial position.

3. Weft beating-up mechanism for looms comprising in combination a reed, a shuttle race parallel to said reed adapted to support and guide a shuttle and constituted at least in part by fingers located above the level of the bottom of the shuttle and in line with the dents of the reed, the said fingers engaging the side of the shuttle furthest from the reed, and holding the shuttle while in flight against the reed, means to move said reed forwards towards but not up to a beat-up position, a comb parallel to said reed, means to raise said comb to bring its teeth into line with and in close proximity to dents of said reed when said reed is in its forward position, means to move said comb forwards up to said beat-up position, means to move said reed backwards from said forward position to its initial position, and means to lower said comb and return it at a lower level to its initial position.

4. Weft beating-up mechanism for looms comprising in combination a reed, a shuttle race parallel to said reed adapted to support and guide a shuttle and constituted at least in part by fingers located above the level of the bottom of the shuttle and in line with the dents of the reed, the said fingers engaging the side of the shuttle furthest from the reed, and holding the shuttle while in flight against the reed, means to move said reed slightly backwards and to return it to its initial position, a comb parallel to said reed, means to raise said comb to bring its teeth into line with, in front of and in close proximity to dents of said reed when said reed is in its backward position, means to move said comb forwards to a beat-up position, and means to lower it and to return it at a lower level to its initial position.

5. Weft beating-up mechanism for looms comprising in combination a reed, a shuttle race parallel to said reed adapted to support and guide a shuttle and constituted at least in part by fingers located above the level of the bottom of the shuttle and in line with the dents of the reed, the said fingers engaging the side of the shuttle furthest from the reed, and holding the shuttle while in flight against the reed, a comb parallel to said reed, means to move said reed forwards, then slightly backwards from its forward position, and finally restore it to its initial position, means to raise said comb to bring its teeth into line with, in front of and in close proximity to dents of said reed after its slight backward movement, means to move said comb forwards to a beat-up position and means to lower it and to return it at a lower level to its initial position.

6. Weft beating-up mechanism as claimed in claim 1 wherein there is provided immediately in front of the reed specified a narrow comb-like track constituting part of the shuttle race specified, the teeth of the said comb-like track being in line with dents of the reed and extending higher than the bottom of said said reed dents, the said reed and track being mounted upon a slay, fingers depending from the top of said slay being provided and being adapted to hold a shuttle against said narrow track and reed whilst in flight.

7. Weft beating-up mechanism as claimed in claim 1 wherein the said reed is mounted in a slay from the top of which depend two sets of fingers in line with the dents of the reed, the said fingers being adapted in conjunction with said reed to support a shuttle in flight and constituting part of the shuttle race specified.

8. Weft beating-up mechanism as claimed in claim 1 wherein the said reed and shuttle race are mounted together on a slay pivoted about pivots at its top edge, a link pivoted to said slay being arranged to draw said slay backwards, tilting it about the pivots at its top edge, prior to the specified raising of the beating-up comb.

9. Weft beating-up mechanism for looms comprising in combination a reed, a shuttle race parallel to said reed adapted to support and guide a shuttle and constituted at least in part by fingers located above the level of the bottom of the shuttle and in line with the dents of the reed, the said fingers engaging the side of the shuttle furthest from the reed, and holding the shuttle while in flight against the reed, a beat-up comb parallel to said reed slidably mounted upon arms pivoted about an axis parallel to, spaced from and at a lower level than said reed for movement towards and away from said reed, means to cause such movements, and means to cause sliding movement of said comb upwards along said arms when said arms approach said reed and to cause sliding movement of said comb downwards along said arms when said arms are in their position furthest from said reed.

10. Weft beating-up mechanism as claimed in claim 9 comprising a hollow shaft about which the arms specified are pivoted, a rod within said hollow shaft spring impelled towards one end thereof, longitudinal slots in said hollow shaft, pins upon said rod passing through said slots, bell-crank levers pivoted about pivots carried by the pivoted arms specified, one arm of each of said bell-crank levers being connected by a link to said comb to impart sliding movement to said comb along said pivoted arms and the other arms of said levers being slotted and respectively engaging the pins specified, together with means for periodically imparting axial movement to said rod against said spring to actuate said bell-crank levers to raise said comb when said arms approach said reed, said spring restoring said rod, bell-crank levers and comb to their initial positions when said pivoted arms are in their position furthest from said reed.

OLIVER SHIMWELL.